No. 828,162. PATENTED AUG. 7, 1906.
S. G. WHITEHOUSE.
WHEELED VEHICLE.
APPLICATION FILED JAN. 14 1905.
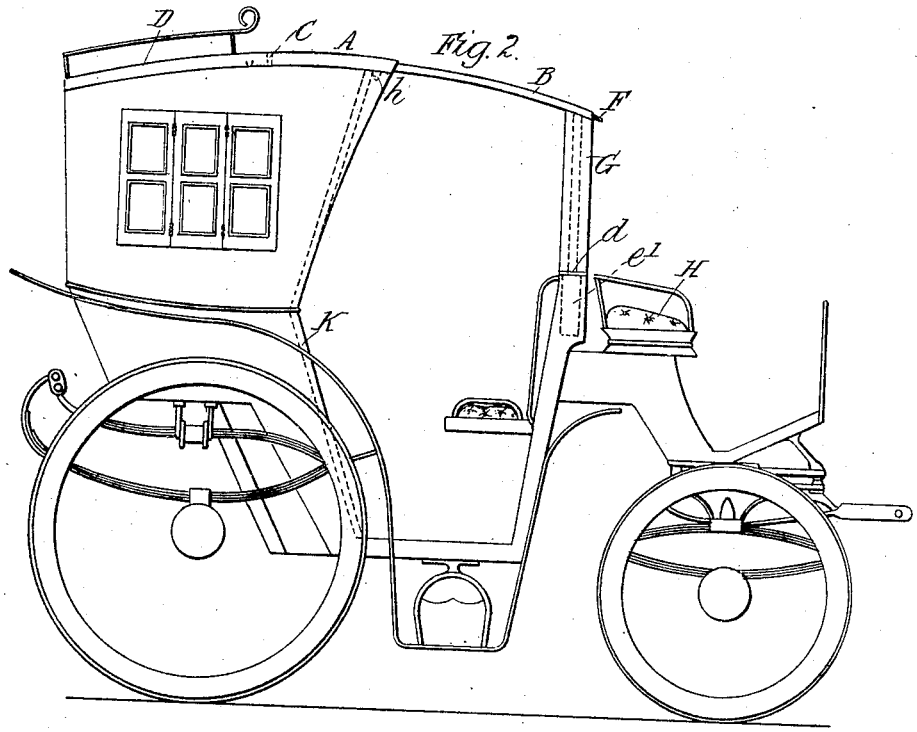
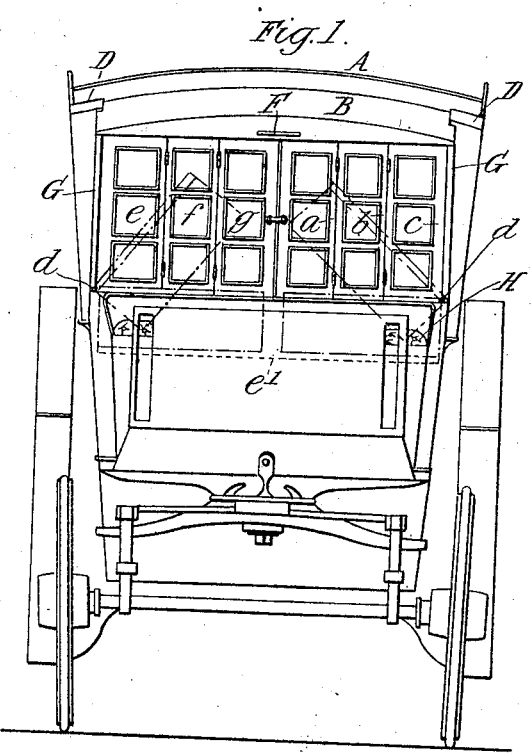
WITNESSES
E. A. Allen.
J. M. Laing.
INVENTOR
SAMUEL G. WHITEHOUSE
BY Edward S. Beach
ATT'Y

UNITED STATES PATENT OFFICE.

SAMUEL GROVES WHITEHOUSE, OF BIRMINGHAM, ENGLAND.

WHEELED VEHICLE.

No. 828,162.            Specification of Letters Patent.            Patented Aug. 7, 1906.

Application filed January 14, 1905. Serial No. 240,989.

*To all whom it may concern:*

Be it known that I, SAMUEL GROVES WHITEHOUSE, cab proprietor, a subject of the King of Great Britain, residing at Phoenix Works, Aston Road, Birmingham, in the county of Warwick, England, have invented certain new and useful Improvements Relating to Wheeled Vehicles, of which the following is a specification.

This invention relates to wheeled vehicles, and more particularly to the kind of vehicles described in the specification of my British Letters Patent No. 6,816, A. D. 1904.

The said invention has for its object the combination, with a vehicle of the above-mentioned kind, of windows such as are described in the specification of my British Letters Patent No. 678, A. D. 1903. These windows may be fitted either above the doors in the usual place or at the sides or in front between the roof-supporting posts. Said windows when fitted between said posts may be adapted when folded and not in use to collapse or fold down in order to afford a more open space in the front of said vehicle than has hitherto been the case. For this purpose the lower corner of each window adjacent to the body of the vehicle is hinged thereto, the hinge lying longitudinally in the same direction as the vehicle, so that said windows collapse inward across the vehicle in the same direction as the wheel-axles.

In order that the invention may be the better understood, I will now proceed to describe the same more fully with reference to the accompanying drawings, in which—

Figure 1 is a front elevation, and Fig. 2 a side elevation, of a vehicle embodying the features of my invention.

A is the roof of the vehicle.

B is the sliding portion, and C the rollers on which said part B rolls or slides.

D is the flanged-roller recess.

F is a handle attached to the part B.

G represents the upright roof-supporting posts, and H is the driver's seat.

K K are the doors.

The windows comprise three or more or less panels *a b c* of frames which are adapted to receive small panes of plate or other glass, gelatin, mica, or other suitable material. The frames *a*, *b*, and *c* are hinged to each other and to the side of the vehicle at *d*. When and if the windows are between the upright post G, hinges *d* are provided and a slot *e* is formed at the back of the driver's seat. The hinges between *a* and *b* are inside the vehicle, while the hinges between *b* and *c* are outside the same. *e f g* are panels of all glass or other material bound in single frames hinged together in a similar manner. *h* is a rubber or other beading for keeping the windows temporarily in place for excluding the weather.

When it is desired to open the windows, the frames are folded back one on the other, and each set, or one of such, is released and lowered on its hinge *d* across the body of the vehicle, where it lies securely out of the way in the slot *e'*, which may be formed in any suitable manner according to the general construction of the vehicle in which my invention is embodied. To replace the windows, it is only necessary to raise the frames to the vertical position and unfold the panels by drawing them together. The window at the side of the vehicle and above the doors operate in the usual manner.

What I claim, and desire to secure by Letters Patent of the United States, is—

1. In a vehicle, the combination of a vehicle-frame having a window-receiving slot with a window hinged to the frame and adapted to swing on said hinge into said slot.

2. In a vehicle, the combination of a frame having a window-receiving slot with a plurality of window-panels hinged edgewise and adapted to fold one upon another, one of said panels being hinged at its corner to permit the plurality of panels when folded one on another to be turned into said slot.

In testimony whereof I have hereunto set my hand, in presence of two subscribing witnesses, this 21st day of October, 1904.

SAMUEL GROVES WHITEHOUSE.

Witnesses:
     JOHN HENRY SMITH,
     PERCY BONE.